US009718539B2

(12) United States Patent
Zabulon et al.

(10) Patent No.: US 9,718,539 B2
(45) Date of Patent: Aug. 1, 2017

(54) AIRCRAFT LANDING GEAR

(71) Applicant: MESSIER-BUGATTI-DOWTY, Velizy Villacoublay (FR)

(72) Inventors: Joel Zabulon, Velizy Villacoublay (FR); David Frank, Velizy Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 32 days.

(21) Appl. No.: 14/857,081

(22) Filed: Sep. 17, 2015

(65) Prior Publication Data
US 2016/0090173 A1 Mar. 31, 2016

(30) Foreign Application Priority Data
Sep. 26, 2014 (FR) ...................... 14 59135

(51) Int. Cl.
| B64C 25/34 | (2006.01) |
| B64C 25/36 | (2006.01) |
| B64D 43/00 | (2006.01) |
| G01P 3/36 | (2006.01) |
| G01P 3/44 | (2006.01) |
| B60T 8/32 | (2006.01) |
| F16C 41/00 | (2006.01) |
| B60T 8/00 | (2006.01) |

(52) U.S. Cl.
CPC .............. *B64C 25/34* (2013.01); *B60T 8/329* (2013.01); *B64C 25/36* (2013.01); *B64D 43/00* (2013.01); *F16C 41/00* (2013.01); *G01P 3/36* (2013.01); *G01P 3/44* (2013.01); *B60T 8/00* (2013.01)

(58) Field of Classification Search
CPC .......... B64C 25/34; B64C 25/36; B64D 43/00
See application file for complete search history.

(56) References Cited

U.S. PATENT DOCUMENTS

| 2002/0030482 A1* | 3/2002 | Iwamoto ................. G01P 3/443 |
| | | 324/174 |
| 2007/0006650 A1* | 1/2007 | Pradier ................... G01P 3/487 |
| | | 73/488 |

(Continued)

FOREIGN PATENT DOCUMENTS

| DE | 10 135 784 A1 | 2/2002 |
| EP | 1 211 500 A1 | 6/2002 |

(Continued)

OTHER PUBLICATIONS

French Preliminary Search Report for FR 14 59135 dated May 20, 2015.

*Primary Examiner* — Justin Benedik
(74) *Attorney, Agent, or Firm* — Sughrue Mion, PLLC

(57) ABSTRACT

An aircraft landing gear comprising an axle (3) intended to receive a wheel (4) comprising a rim (6) mounted to rotate on the axle (3) by means of at least one rolling bearing (8). The rolling bearing (8) comprises an inner ring (11) mounted around the axle (3) and an outer ring (12) rotationally secured to the rim (6) of the wheel (4). The landing gear further comprising a measurement device (21) intended to perform measurements of at least one operating parameter of the landing gear. The measurement device (21) is incorporated in the rolling bearing (8) by being secured to one of the inner or outer rings of the rolling bearing (8).

13 Claims, 1 Drawing Sheet

(56) References Cited

U.S. PATENT DOCUMENTS

2013/0091969 A1\* 4/2013 Bucheton .............. B64C 25/405
                                                    74/405
2016/0221669 A1\* 8/2016 Didey ................... B64C 25/405

FOREIGN PATENT DOCUMENTS

| EP | 1 744 163 A1 | 1/2007 |
| EP | 2 581 305 A1 | 4/2013 |
| WO | 01/20187 A1 | 3/2001 |

\* cited by examiner

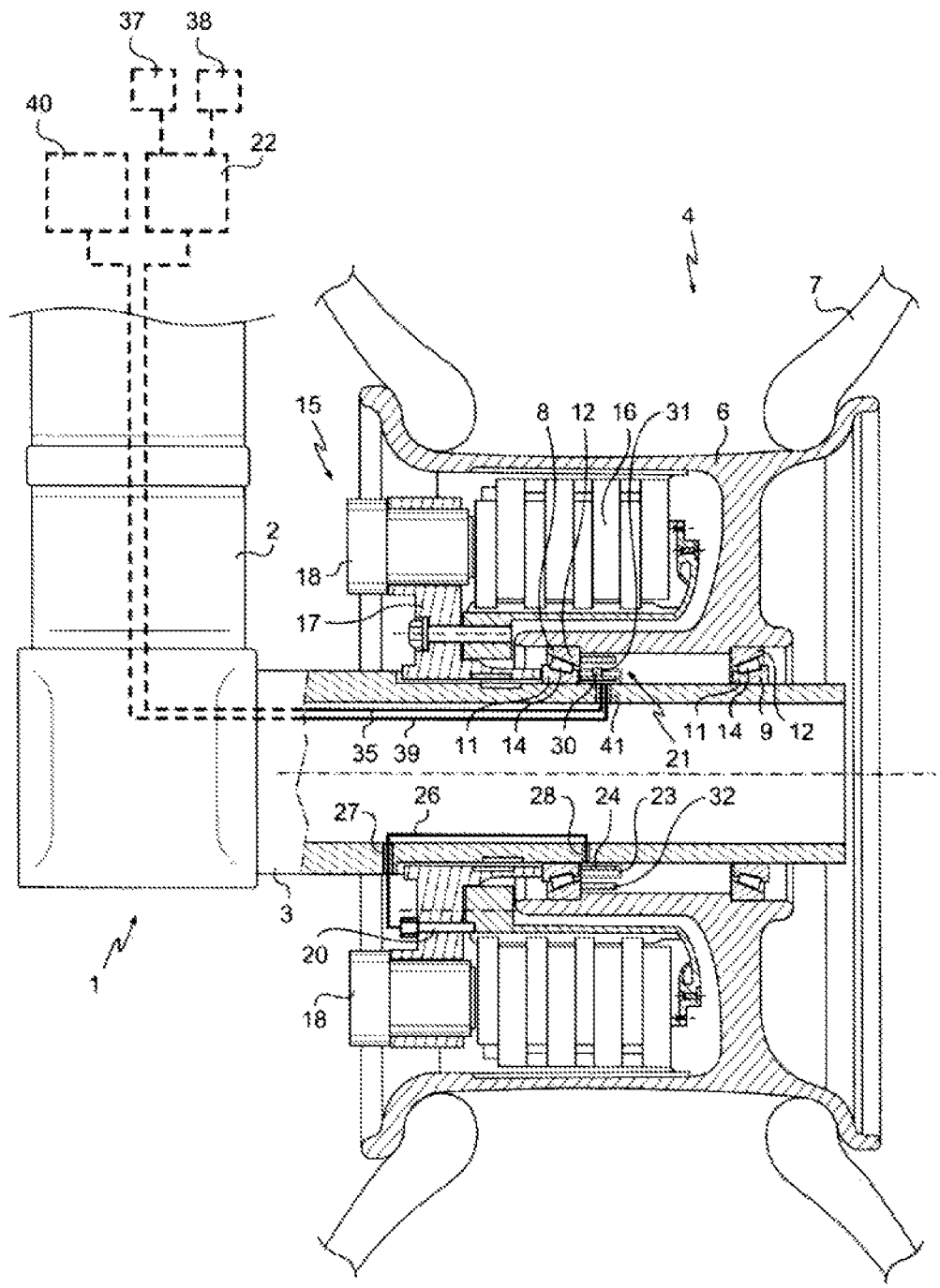

ND GEAR

CROSS REFERENCE TO RELATED APPLICATIONS

This application claims priority based on French Patent Application No. 14 59135 filed Sep. 26, 2014, the contents of which are incorporated herein by reference in their entirety.

The invention relates to the field of distributed architectures of system associated with aircraft landing gears.

BACKGROUND OF THE INVENTION

The avionics systems of modern aircraft are increasingly less "centralized" and increasingly more "distributed".

Thus, centralized architectures, comprising a relatively complex central computer connected by multiple electrical cables to actuators that it drives or to sensors that supply it with measurement data, are being replaced by distributed architectures comprising a certain number of "remote" computers situated in proximity to the actuators and the sensors. These remote computers are possibly linked to a computation-dedicated "core" computer.

The splitting up of the central computer into a plurality of remote computers makes it possible to reduce the weight of the aircraft through the simplification of the wiring, and to reduce the cost of the avionics systems, notably by virtue of the fact that the remote computers and the core computer are now designed to be generic computers that can be incorporated in different systems. This splitting up also makes it possible to improve the availability of the systems which can operate in degraded mode and which offer more numerous reconfiguration possibilities in the event of failure of a remote computer, of an actuator or of a sensor.

A certain number of architectures have been proposed to distribute, on the one hand, the braking system of the wheels of the aircraft (of which the implementation of the anti-skid function requires the speed of rotation of the braked wheel to be measured), and, on the other hand, the system for monitoring operating parameters of the landing gear (temperature of the brakes, pressure of the tyres, etc.). In each of these architectures, a relatively large number of electrical cables still run to the landing gears, which is detrimental in terms of weight and reliability.

OBJECT OF THE INVENTION

The object of the invention is to reduce the number of electrical cables incorporated in the systems associated with the landing gear and running to the landing gears.

SUMMARY OF THE INVENTION

In order to realize this aim, an aircraft landing gear is proposed comprising an axle intended to receive a wheel comprising a rim mounted to rotate on the axle by means of at least one rolling bearing, said rolling bearing comprising an inner ring mounted around the axle and an outer ring rotationally secured to the rim of the wheel, the landing gear further comprising measurement means intended to perform measurements of at least one operating parameter of the landing gear. According to the invention, the measurement means are incorporated in the rolling bearing by being secured to one of the inner and outer rims of the rolling bearing. By incorporating the measurement means in the rolling bearing of the wheel of the aircraft, these measurements means are positioned as close as possible to the sensors measuring the operating parameters of the landing gear, and the length of the electrical cables linking the sensors to the measurement means is therefore reduced. The measurement means can moreover transmit these operating parameters to an electronic module of the aircraft via a single data cable running to the landing gear. Thus, both the number and the length of the cables associated with these measurement means situated on the landing gear are significantly reduced.

BRIEF DESCRIPTION OF THE DRAWINGS

The invention will be better understood in light of the following description with reference to the attached FIGURE, which represents a front view of the landing gear of the invention and a cross-sectional view of a wheel borne by the landing gear of the invention.

DETAILED DESCRIPTION OF THE INVENTION

Referring to the single FIGURE, the landing gear 1 of the invention conventionally comprises a box structure articulated to the structure of an aircraft in which a sliding rod 2 is mounted to slide telescopically. The sliding rod 2 bears, at its end, an axle 3 intended to receive two wheels 4, only one of the wheels 4 being represented in the FIGURE to improve the readability of this FIGURE.

The wheel 4 comprises a rim 6 which bears a tyre 7 and which is mounted to rotate on the axle 3 by means of an inner tapered rolling bearing 8 and an outer tapered rolling bearing 9. Each of these tapered rolling bearings 8, 9 comprises an inner ring 11 mounted around the axle 3, an outer ring 12 rotationally secured to the rim 6 of the wheel 4, a cage and tapered rollers 14.

The wheel 4 is further equipped with a brake 15 suitable for braking the wheel, the brake 15 comprising a stack of carbon discs 16 extending into the rim 6 of the wheel 4, a crown ring 17 fixed onto the axle 3, and a plurality of electromechanical actuators 18 borne by the crown ring 17 and adapted to selectively apply a braking load onto the stack of discs 16.

The brake 15 comprises a temperature sensor 20 intended to measure the temperature prevailing inside the stack of discs 16 (or, to be more precise, in proximity to the stack of discs 16). This temperature sensor 20 is in this case a thermocouple probe which extends inside a cavity of the brake parallel to the axle 3 and in proximity to the stack of discs 16.

Measurement means 21 are incorporated in the inner tapered rolling bearing 8 by being secured to the inner ring 11 of the inner tapered rolling bearing 8.

The measurement means 21 are here intended to acquire measurements of temperature of the stack of discs 16 of the brake 15 supplied by the temperature sensor 20, to measure and to acquire the speed of rotation of the wheel 4, and to transmit these data to an electronic module 22 of the aircraft situated in the hold, in proximity to the landing gear 1.

The measurement means 21 comprise a casing 23 of substantially annular outer form. The casing 23 is fixed to the inner ring 11 of the inner tapered rolling bearing 8 and extends around the axle 3. The casing 23 contains a flexible electrical board 24 which also has, when incorporated in the casing 23, an annular form. Electrical components, including processing components and communication components, are mounted on both faces of the flexible electrical board 24.

To acquire the measurements of temperature of the stack of discs 16 of the brake 15, the processing components of the flexible electrical board 24 are linked by a first electrical cable 26 to the temperature sensor 20. The first electrical cable 26 passes through the axle 3 by passing through a first orifice 27 formed in the axle 3 for this purpose, runs inside the axle 3, then reaches the measurement means by passing through the axle through a second orifice 28. The processing components acquire a first measured signal supplied by the temperature sensor 20 and transform this first measured signal into a temperature signal representative of the temperature of the stack of discs 16 of the brake 15.

To measure the speed of rotation of the wheel 4, the measurement means comprise a magnetic sensor 30, in this case a Hall effect sensor. The magnetic sensor 30 is mounted on the flexible electrical board 24 and is arranged in such a way as to protrude slightly from the casing 23 through an opening 31 formed for this purpose in the casing 23.

The measurement means 21 also comprise a measurement crown ring 32 provided with a plurality of magnets arranged on an inner face of the measurement crown ring 32. The measurement crown ring 32 is also incorporated in the inner tapered rolling bearing 8 by being secured to the outer ring 12 of the inner tapered rolling bearing 8. The measurement crown ring 32 and the magnetic sensor 30 are positioned in such a way that the magnets of the measurement crown ring 32 are directly facing the magnetic sensor 30. A rotation of the wheel 4 of the aircraft leads to a rotation of the outer ring 12 of the inner tapered rolling bearing 8 and therefore of the measurement crown ring 32. The magnetic sensor 30 detects magnetic field variations resulting from the rotation of the magnets of the measurement crown ring 32. The frequency of these magnetic field variations is proportional to the speed of rotation of the wheel 4. The magnetic sensor 30 therefore generates a second measured signal, acquired by the processing components of the flexible electrical board 24, which transform this second measured signal into a speed signal representative of the speed of rotation of the wheel 4.

It will be noted that the tachometer thus formed by the magnetic sensor 30 and by the measurement crown ring 32 does not require the use of a driveshaft linked to a cap of the wheel, as is the case with traditional aircraft wheel tachometers. The absence of such a shaft makes it possible to avoid a certain number of problems, including the generation of high and potentially noisy vibration levels at the tachometer linked to the rigidity of the shaft, the wear of the teeth forming the coupling between the shaft and the wheel cap, etc.

The temperature signal and the speed signal are transmitted to the electronic module 22 of the aircraft by the communication components of the flexible electrical board 24 via a second electrical cable 35 running inside the axle 3. The second electrical cable 35 passes through the axle 3 in proximity to the measurement means 21 by passing through a third orifice 41 formed in the axle 3.

The temperature signal is then transmitted by the electronic module 22 to a first computer 37 suitable for processing this temperature signal. The processing performed can, for example, consist in emitting an alarm when the measured temperature of the stack of discs 16 of the brake 15 is above a certain predefined threshold, or when significant temperature differences are detected between the brakes of different wheels. Similarly, the speed signal is then transmitted by the electronic module 22 to a second computer 38 (for example of BSCU type) responsible for implementing the anti-skid function.

It will be noted that a third electrical cable 39 runs inside the axle 3 by following a run similar to that of the second electrical cable 35. The third electrical cable 39 links a power module 40 to the flexible electrical board 24, and is used to transmit thereto an electrical supply necessary to its operation.

The invention is not limited to the particular embodiment which has just been described, but, quite to the contrary, covers any variant falling within the scope of the invention as defined by the claims.

Although the description here has only been of measurement means that are incorporated in the inner tapered rolling bearing, they may perfectly well be incorporated in the outer tapered rolling bearing. The incorporation of the measurement means in the outer tapered rolling bearing is advantageous from the thermal point of view, because the outer tapered rolling bearing is less subject to the temperature rise provoked by the heating of the stack of discs during braking. Provision can also be made to provide the landing gear with first measurement means equipping the inner rolling bearing and second measurement means equipping the outer rolling bearing, allowing for redundancy of the functions (acquisition, measurement, processing, etc.) performed by the measurement means.

Although the description has been of measurement means secured to the inner ring of the rolling bearing, the measurement means can perfectly well be secured to the outer ring of the rolling bearing. In this case, their electrical energy supply must be provided without wired connection. One advantageous way of powering the measurement means consists in transmitting electrical energy to them via an inductive coupling produced by a first coil with which the inner ring is equipped and a second coil with which the outer ring is equipped. Any other type of magnetic or radiofrequency coupling may be implemented, with any type of antenna. The measurement means are thus perfectly suited to acquiring measurements produced by one or more sensors positioned on the wheel and therefore rotationally secured thereto: sensor for measuring the pressure prevailing inside the tyre, accelerometer, etc. The measured data are then transmitted via the inductive coupling in the reverse direction, that is to say from the outer ring to the inner ring.

Although it has been indicated that the electrical board comprises a single Hall effect sensor, it is of course possible to provide the measurement means with a plurality of sensors, which makes it possible to improve the accuracy, the resolution and the reliability of the measurement.

The magnetic sensor intended to measure the speed of rotation of the wheel is not necessarily a Hall effect sensor.

The magnetic sensor may for example comprise a winding in which circulates a measurement current generated by the effect of the rotation of the magnets of the measurement crown ring and the amplitude of which varies as a function of the magnetic field variations resulting from the rotation of the magnets. In the case where such a sensor is used and where the measurement current is sufficient, it may be particularly advantageous to use this measurement current generated in the winding to power the electrical board of the measurement means. The third electrical cable is then no longer necessary. The winding is then positioned on the ring of the rolling bearing secured to the measurement means, and the magnet or magnets is/are positioned on the other ring.

The measurement crown ring, for its part, is not necessarily provided with magnets, but can for example take the form of a toothed wheel. The magnetic field measured at a given instant by the magnetic sensor has a different amplitude depending on whether a tooth or a hollow between two teeth is positioned facing the magnetic sensor at that given instant.

It will be noted here that the diameter of the measurement crown ring is significantly greater than that of a measurement crown ring of a traditional tachometer, which is incorporated inside the axle and not outside as is the case in the invention. It is thus possible to design a measurement crown ring having a number of magnets or teeth up to two times greater than that of a traditional measurement crown ring, which makes it possible to significantly improve the accuracy of the measurement of speed of the wheel of the aircraft at low speed.

It is also possible to use a non-magnetic speed sensor, for example an optical sensor cooperating with an optical coding wheel. The optical sensor is then incorporated in the measurement means and the coding wheel is mounted rotationally secured to the ring of the rolling bearing which is not secured to the measurement means.

It is of course conceivable to connect the measurement means to other sensors of operating parameters of the landing gear, for example to a sensor of the pressure of the tyre of the wheel, to an accelerometer, to a braking torque sensor, etc.

Although it has been described that the second electrical cable linking the measurement means to the electronic module of the aircraft and the third electrical cable run inside the axle, it is possible to install these electrical cables (or just one of these cables) in such a way as to run along the axle by being situated outside the latter.

The invention claimed is:

1. An aircraft landing gear comprising an axle (3) intended to receive a wheel (4) comprising a rim (6) mounted to rotate on the axle (3) by means of at least one rolling bearing (8), said rolling bearing (8) comprising an inner ring (11) mounted around the axle (3) and an outer ring (12) rotationally secured to the rim (6) of the wheel (4), the landing gear further comprising measurement means (21) intended to perform measurements of at least one operating parameter of the landing gear, characterized in that the measurement means (21) are incorporated in the rolling bearing (8) by being secured to one of the inner and outer rings of the rolling bearing (8).

2. The aircraft landing gear according to claim 1, in which the measurement means (21) comprise at least one sensor (30) intended to measure the speed of rotation of the wheel (4) of the aircraft.

3. The aircraft landing gear according to claim 2, in which the sensor (30) is a magnetic sensor cooperating with a measurement crown ring (32) mounted rotationally secured to the other of the outer and inner rings of the rolling bearing (8).

4. The aircraft landing gear according to claim 3, in which the measurement crown ring (32) is in the form of a toothed wheel.

5. The aircraft landing gear according to claim 3, in which the measurement crown ring (32) comprises at least one magnet.

6. The aircraft landing gear according to claim 3, in which the sensor (30) is a Hall effect sensor.

7. The aircraft landing gear according to claim 3, in which the sensor comprises a winding.

8. The aircraft landing gear according to claim 7, in which the rotation of the measurement crown ring generates a current circulating in the winding, said current being used to power the measurement means.

9. The aircraft landing gear according to claim 2, in which the sensor (30) is an optical sensor.

10. The aircraft landing gear according to claim 9, in which the optical sensor cooperates with a coding wheel mounted rotationally secured to the other of the outer and inner rings of the rolling bearing (8).

11. The aircraft landing gear according to claim 1, in which the measurement means (21) comprise an electrical board (24) intended to acquire measurements of at least one of speed of rotation of the wheel of the aircraft, temperature of a brake of the wheel, and pressure of a tyre of the wheel and/or of an acceleration of the wheel.

12. The aircraft landing gear according to claim 1, in which the measurement means (21) are electrically linked to an electronic module (22) of the aircraft by an electrical cable (35) running inside the axle (3).

13. The aircraft landing gear according to claim 1, in which the measurement means (21) are electrically linked to an electronic module (22) of the aircraft by an electrical cable running along the axle outside the latter.

* * * * *